Feb. 10, 1959 J. R. POWER 2,873,316
PARTY LINE LOCK-OUT CIRCUIT
Filed March 29, 1956
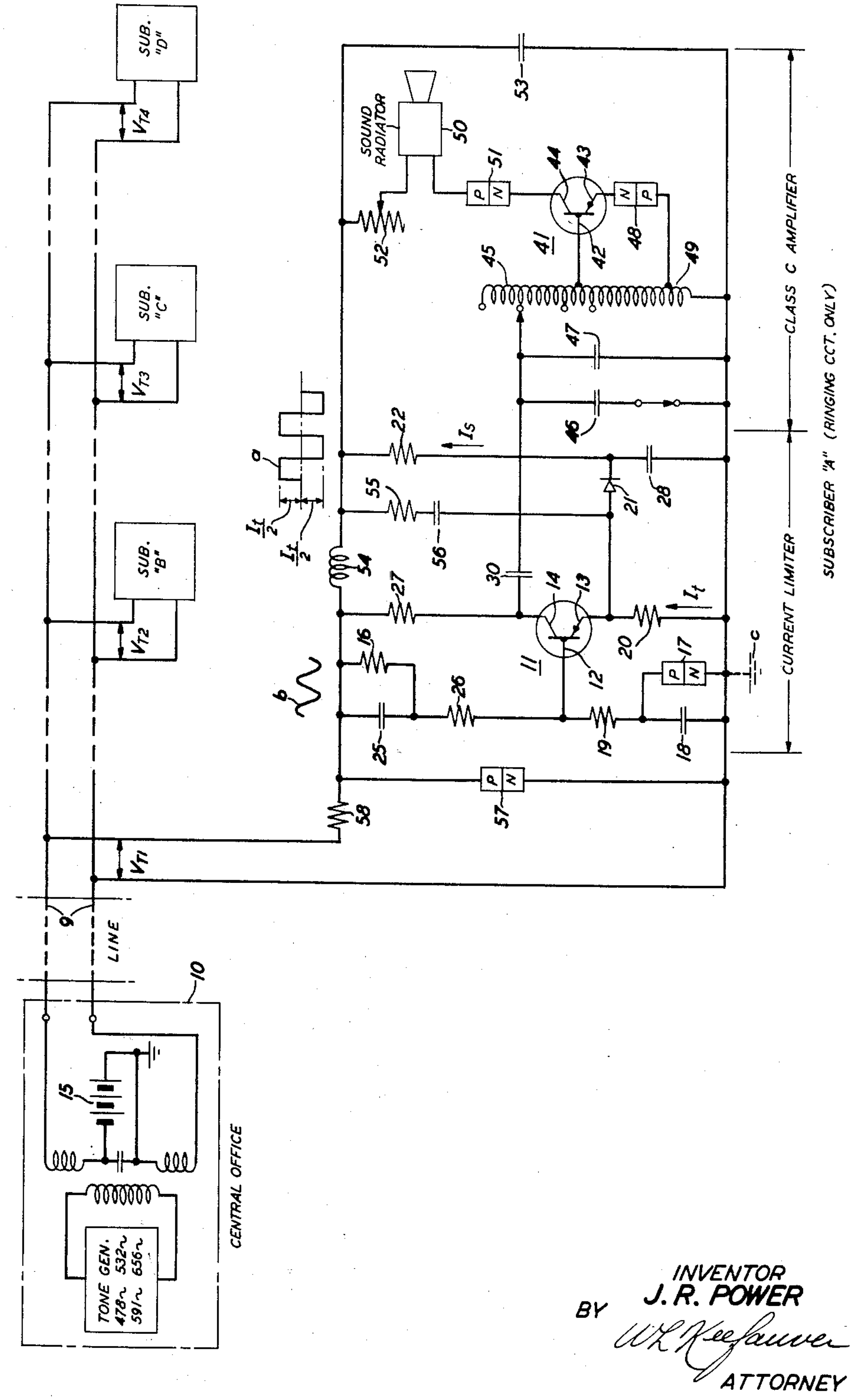
INVENTOR
J. R. POWER
BY W. L. Keefauver
ATTORNEY United States Patent Office 2,873,316

Patented Feb. 10, 1959

2,873,316

PARTY LINE LOCK-OUT CIRCUIT

James R. Power, Chatham, N. J., assignor to Bell Telephone Laboratories, Incorporated, New York, N. Y., a corporation of New York Application March 29, 1956, Serial No. 574,718

10 Claims. (Cl. 179—17)

This invention relates to lock-out circuits.

Lock-out circuits have fairly general application. The present invention, however, will be described in relation to a party-line telephone system in which principles of the invention can be employed to advantage.

One object of the invention is to lock out a plurality of load circuits in response to a change in condition associated with any one load circuit.

Another object of the invention is to prevent false signalling in a party-line telephone system. More particularly, it is an object of the invention to prevent false signalling in a party-line telephone system which employs signalling currents lying in the frequency range of the transmitted speech currents.

A further object is to disable all signal indicating devices on a party line when any one party is off-hook.

In the particular telephone system of the illustrative embodiment, signalling is accomplished by signals in the voice frequency range. It is, therefore, necessary to disable the signalling, or indicating, device on a party line when any one subscriber is talking. In accordance with principles of the invention, this is accomplished in the illustrative embodiment by connecting a semiconductor breakdown diode in series with each signal indicating device. These diodes are biased by the terminal voltages of their associated substation circuits. Further, these diodes each have a breakdown voltage such that when all sets are on-hook, each diode conducts in its breakdown region and thus has little or no effect on the signalling device. When any subscriber is off-hook, however, the terminal voltage is insufficient to maintain breakdown, so that the diodes assume their high reverse impedance. This high impedance, in series with the signal indicating device, prevents any appreciable output from the latter.

A feature of the invention is that the breakdown diode also insures proper operating potential for the amplifier whose output is applied to the signalling indicating device.

It should be noted that the invention is not limited to party-line systems employing voice frequency signalling, nor is it limited to telephone systems. It is, in fact, of general application where it is desired to lock out a plurality of load circuits in response to a change in condition associated with any one load circuit.

The invention, together with its various features and objects, will be more fully appreciated from a consideration of the single figure of the attached drawing which illustrates a party-line telephone system including a lock-out circuit in accordance with principles of the invention.

The attached figure illustrates four telephone subscribers, designated subscribers A, B, C, and D, bridged on a common or party line 9 which extends to a central office 10. The ringing or signalling circuit only of subscriber A is illustrated in detail; the ringing circuits of the other subscribers are assumed to be similar and the speech circuits have not been illustrated since they form no part of the present invention.

Signalling is accomplished by four frequencies which lie in the voice frequency range. These freqencies, 478, 532, 591, and 656 cycles, are chosen so that the ratio of adjacent frequencies is 9 to 10. The resulting sound may be given a distinctive character by a low frequency interruption. This ratio insures that neither second nor third harmonics of the lower frequencies coincide with the fundamentals of any of the higher frequencies, particularly where the same series of frequencies is extended upward to accommodate more than four parties or for other purposes. It is assumed that these four frequencies are assigned, respectively, to subscribers A, B, C, and D. If eight parties were assigned to a common line on a full-selective basis, the additional signalling frequencies would be 729, 810, 900, and 1000 cycles.

Each ringing circuit, or tone ringer, as it may be called, is therefore equipped with a frequency selective circuit responsive to the particular frequency assigned to its associated subscriber, and with means for radiating the selected tone when received.

Frequency selectivity is achieved, in part, by the output stage which comprises a class C amplifier having a tuned input circuit. Since high Q circuits are expensive to build, it is impracticable to obtain sufficient selectivity from the tuning elements alone. The use of class C amplification contributes a major part of the selectivity, in that it gives no output unless the response of the tuned circuit exceeds a certain minimum amplitude. The band of frequencies for which the amplifier gives output is thus a function of the amplitude of the current driving the tuned circuit. Also, as may be seen from the illustrative signalling frequencies given above, it is important to provide discrimination against second harmonics, particularly of lower signalling frequencies, so that ringers assigned the higher frequencies will not respond to second harmonics of the lower frequencies. Accordingly, still further frequency discrimination is achieved by the current limiter stage preceding the amplifier which derives from the signalling waves a rectangular waveform *a* hav- a closely regulated peak-to-peak amplitude, so as to provide a constant driving current, and one which is symmetrical both with respect to an arbitrary zero axis and with respect to the duration of the positive and negative portions. The constancy of amplitude insures uniformity of bandwidth, and the symmetries insure that the second harmonic components of the input waves will be zero. The third harmonic components are unimportant here, as they fall above the range covered by ringing frequencies for as many as eight parties, the largest number contemplated in this embodiment.

Since signalling is accomplished by currents whose frequencies lie within the band of the speech currents, it is necessary to disable the ringing circuit of each subscriber when any one of the subscribers on the line is off-hook. This protection is herein denoted as "talk-off" protection. In accordance with principles of the invention talk-off protection, in general, is provided by a p–n junction silicon breakdown diode 51 which is connected in series with the sound radiator 50. This diode may be of a type described in an article by F. H. Chase, B. H. Hamilton, and D. H. Smith entitled "Transistors and Junction Diodes in Telephone Power Plants," Bell System Technical Journal, July 1954, volume 33, page 827. When all subscribers are on-hook, the terminal voltages $V_T$ of the various sets will lie in the range of 40 to 50 volts in the illustrative embodiment, depending on loop length. When any one set is off-hook, the additional load placed on the line thereby will reduce the terminal voltage of each set to a value in the range of from 13 to 23 volts. A diode 51 is, therefore, chosen which has a breakdown voltage slightly greater than the expected maximum off-hook value, for example 25 volts. In its breakdown region, diode 51 represents a negligible alternating-current impedance so that when all sets are on-hook, it absorbs a negligible portion of the power delivered by amplifier 41 to the sound radiator 50. When any subscriber goes off-hook, however, the terminal voltage is insufficient to maintain breakdown, so that diode 51 assumes its high reverse impedance of several megohms, or more. This high impedance, in series with the sound radiator 50, makes any appreciable output from the latter impossible.

The specific circuit illustrated will now be described in detail. The current limiter stage of the tone ringer comprises a p–n–p junction transistor 11 having base 12, emitter 13, and collector 14. (This current limiter forms the principal subject matter of a copending application of L. A. Meacham, Serial No. 574,714, filed of even date herewith and since matured into U. S. Patent 2,850,650, issued September 2, 1958.) Biasing and operating voltages for this transistor are provided by the source of direct current 15 located at the central office. The base of the transistor is given a fixed bias by a voltage divider connected across the line and comprising, primarily, resistor 16 and a p–n junction silicon breakdown diode 17 by-passed for alternating currents by capacitor 18. The values of resistors 19 and 26 are low relative to the direct-current resistance of resistor 16 and diode 17, and may be neglected for the moment. The collector 14 is returned to the negative line terminal by load resistor 27.

The silicon junction diode 17 may be of the same type as diode 51. As with diode 51, a significant characteristic of this type of diode is that it exhibits a substantially constant voltage across its terminals for applied reverse biases which exceed a critical or breakdown voltage. In the illustrative embodiment, a diode 17 is selected which has a breakdown voltage of 9.4 volts so that the base 12 of the transistor with respect to an arbitrary reference point *c*, actually the positive line terminal, has a fixed bias of about 9.4 volts.

Resistor 20 is connected in series with the emitter electrode and serves to stabilize the emitter current by negative feedback. The transistor, in fact, regulates the voltage across this resistor to be approximately the same as the voltage across the diode 17. The bias on the base is sufficient to bias the transistor normally conducting so that a current $I_t$ normally flows through resistor 20. This current, in fact, is held substantially constant at this value.

As described in the above-noted Meacham application, fifty percent of this regulated current $I_t$ is by-passed around the transistor by a circuit including a diode 21 and a resistor 22 which is connected to the negative line terminal. In the absence of applied signals, diode 21 is conducting and hence a low resistance. The remaining fifty percent of $I_t$ flows through the collector and resistor 27.

Signal input, waveform *b*, is coupled to the base by a capacitor 25 and resistors 26 and 19. (The diode 17 and by-pass capacitor 18 represent a substantially zero alternating-current impedance.) As the input signal swings the base above its mean bias potential, the chosen bias is such that the transistor is driven to cut-off by the positive peaks of the input signals. As the input signal swings the base below its mean bias potential, the emitter current of transistor 11 increases until it becomes equal to $I_t$, which remains substantially constant. As a result, the current through diode 21 falls to zero, and this diode cuts off. Furthermore, when the diode 21 is conducting, it has a low resistance, and under this condition, the emitter 13 faces a low impedance produced by capacitor 23 in series with the diode 21, effectively by-passing resistor 20 for signal current. As a result, the rate of change of emitter current with base voltage is rapid over the region between cut-off of the transistor 11 and cut-off of the diode 21. When diode 21 becomes nonconducting, however, the impedance faced by the emitter rises to the relatively large value determined by resistor 20 (93,100 ohms in a specific embodiment). This large impedance provides a sufficient amount of negative feedback so that any appreciable further increase in emitter current is prevented. Accordingly, the variation in emitter current is limited at $I_t$, peak-to-peak. Since most of this emitter current passes through the collector 14, the latter delivers, at high source impedance, a square wave of current limited at $\pm I_t/2$ which flows through capacitor 30 to the input of the class C amplifier.

It may be noted that $I_{c0}$ flows through a path including resistors 27 and 19. This affects the direct-current collector potential and to a small amount the bias on the base, but its variations with temperature, aging, or from one transistor to another, have no appreciable effect on the peak-limited output since the same amount of $I_{c0}$ is added, as a bias, to both the positive and negative swings of the output current. The limiting value is determined approximately by current flowing through resistor 20, a path which does not include $I_{c0}$.

In this circuit, the base never accepts more than a few microamperes of signal input current. Its alternating-current inputs impedance is almost infinite except for a small range of signal voltages near zero (resistor 26 insures that the impedance facing the loop will be sufficiently high at these low amplitudes) and symmetrical for positive and negative swings. Accordingly, the signal voltage at the base is almost a pure sine wave. This is important because of the following considerations. In order that the clipped current delivered to the tuned input circuit of the amplifier may contain a uniform amount of the fundamental component, its duty cycle should remain fairly constant, as well as its peak amplitude. Moreover, since the second harmonic of the lowest signal frequency (478 cycles) falls about midway between the two highest ones for eight parties (900 and 1000 cycles), it is desirable that the second harmonic of the signal frequency be kept small by holding the duty cycle close to fifty percent. That is, the timing of the square wave should not only be stable, but also symmetrical in order to maintain sensitivity margins and to avoid the possibility of false signalling by the second harmonic of the 478-cycle signalling frequency.

If $I_t$ is the total direct current flowing in resistor 20 and $I_s$ is the by-pass direct current flowing in resistor 22, it can be shown that the ratio of the durations $t_1$ and $t_2$ of the two half-cycles of the square wave is $$\frac{t_1}{t_2}=\frac{I_s}{I_t-I_s}$$

The "duty cycle" may be expressed as $$\frac{t_1}{t_1+t_2}=\frac{I_s}{I_t}$$

Resistors 20 and 22 are, therefore, chosen in relation to the expected average on-hook loop potential and the bias voltage, from diode 17, to make $I_s$ half as large as $I_t$. Some departure from the ideal fifty-fifty division of current can be tolerated, however.

The collector resistor 27 is chosen with several conflicting considerations in mind. From an alternating-current standpoint, a large value is desirable so that all of the alternating current will flow into the tuned circuit even at resonance. From a direct-current standpoint, a small value is desirable so that the total direct-current voltage drop will not exceed the available collector voltage. A value of 240,000 ohms was found acceptable in one embodiment from both standpoints. It might be noted that resistor 27 also controls the value of a small alternating current which flows from the line through resistor 27, capacitor 30 and the resonant input circuit of the class C amplifier. This current is proportional to the alternating-current signal voltage on the line and 180° out of phase with the main driving current in the resonant circuit. This out-of-phase current provides compensation for slight imperfection in the regulation of the current limiter stage.

Turning now to the class C amplifier; this amplifier comprises a p-n-p transistor 41, having base 42, emitter 43, and collector 44 electrodes. A resonant input circuit comprises the coil 45, provided with selectable taps, and a pair of capacitors 46 and 47. A substantially constant voltage drop, equivalent to a small negative bias, is applied in series with the emitter by a p-n junction silicon diode 48 which may be similar to diode 17, but which is connected with opposite polarity, having a breakdown voltage in the "forward" direction on the order of .6 volt. Base current flows at each negative voltage peak, driving the transistor to saturation; the transistor 41, therefore, behaves as a switch which opens and closes the collector-emitter path at an audio frequency rate and delivers pulses of current which are converted to sound by the sound radiator 50. The sound level may be adjusted by potentiometer 52. A pulse of collector current flows through this radiator for a portion of each cycle, generating the tone ringer audible output. The capacitor 46 is made selectable and the coil 45 is provided with several taps so that the desired tuning frequencies are available by selection of various tap-capacitor combinations.

The alternating current output circuit for transistor 41 is completed through capacitor 53. This capacitor, together with coil 54, forms a low pass filter across the "power supply." Coil 54 further acts as a choke coil and prevents the current surges delivered to the sound radiator 50 from getting onto the line 9.

The frequency discrimination afforded by the resonant input circuit is further increased by the amplitude gating action of the diode 48. Only when the voltage peaks across the portion of the tuned circuit between a tap 49 on the inductor 45 and the base 42 are greater than about 0.6 volt, the "breakdown" voltage of the diode, is there sufficient base current to drive the transistor.

In order to maintain good selectivity and high sound output, the $\alpha$ of the transistor 41 should be close to unity. This follows from a need to have the transistor reach saturation without putting too great a load on the tuned circuit; and from the fact that the common-emitter configuration current gain is equal to $\alpha/1-\alpha$. The value of $\alpha$ may be effectively increased by adding positive feedback. This feedback is obtained by returning the emitter 43 circuit to the tap 49 on the inductor 45. The amount of feedback is carefully chosen so that oscillation does not occur as a result of a combination of high Q and high $\alpha$.

As described above, breakdown diode 51, in series with sound radiator 50, provides talk-off protection. That is, responsive to any subscriber on the line going off-hook, all signalling circuits will be disabled or locked out.

This diode is further chosen to provide the proper voltage for the collector 44 of transistor 41. As mentioned above, this type of diode exhibits a substantially constant voltage in its breakdown region. This voltage is chosen not only to lie between the on-hook and off-hook terminal values, but also to achieve proper operation of the collector 44; otherwise, the line voltage might be so high as to exceed the maximum rated collector voltage of the transistor.

Supplementary talk-off protection is also provided in the illustrated circuit in accordance with principles described more fully in a copending application of L. A. Meacham, Serial No. 574,715, filed of even date herewith and since matured into U. S. Patent 2,823,267, issued February 11, 1958. When a talking party goes on-hook, it takes the central office a fraction of a second to recognize the on-hook condition and remove any signalling currents, busy signals, or the like, which may be on the line 9. Were the ringing circuits immediately re-enabled, they might be falsely energized by such signals. Such improper response is prevented, however, by a circuit including resistor 55 and capacitor 56. When the terminal voltage increases from its off-hook to its on-hook value, capacitor 56 is charged to its new value by a circuit path including also the biased stabilizing resistor 20 of transistor 11. Capacitor 56 is relatively large (1 microfarad in a specific embodiment), and the time constant associated with it (resistors 20 and 55 were 93,100 and 200,000 ohms, respectively, in the illustrative embodiment) is such that a current of sufficient magnitude is drawn through resistor 20 for a sufficient period to bias transistor 11 beyond cut-off or insufficiently conducting to enable the class C amplifier, for the period necessary for the central office to remove any signalling currents from the line. This cut-off condition is aided by the large valued capacitor 18 (2 microfarads in the same specific embodiment). The charge acquired on this capacitor during the off-hook condition holds the base more positive than normal for a brief period until it has time to adjust to the on-hook condition.

Protection against transients or lightning is afforded by a breakdown diode 57. This diode is similar to diodes 17 and 51 but has a breakdown voltage higher than the normal line voltage $V_T$. It will, therefore, break down only for excessive voltages and protect the remainder of the circuit, particularly the transistors, from damage. Resistor 58 limits to a safe value the current drawn when diode 57 breaks down.

Although the invention has been described in its relation to a specific embodiment, it should not be deemed limited to the specific embodiment illustrated, since numerous other embodiments and modifications will readily occur to one skilled in the art without departing from the spirit or scope of the invention.

What is claimed is:

1. In combination: a source of direct current, a plurality of load circuits each connected in parallel with said source, utilization means associated with each of said load circuits which lower the voltage across each of said load circuits from a first value when none of said utilization circuits is being utilized to a second value when any one of said utilization circuits is utilized, and means for disabling each of said load circuits when any one of said utilization means is utilized comprising a breakdown diode connected in series with each of said load circuits, all of said diodes being similarly poled with respect to said source, said diodes each having a breakdown voltage intermediate said first and said second values and poled to operate in its breakdown region in response to applied voltages of said first value.

2. In combination: a central office including a source of direct current, a transmission line extending from said central office, a plurality of substation circuits bridged across said line, each of said substation circuits including a signalling device, and means for disabling said device when any substation circuit is off-hook comprising a breakdown diode associated with each of said signalling devices, each of said diodes being connected in series with its associated signalling device and poled to conduct in the reverse direction, and said diodes each having a breakdown voltage lower than the terminal voltage of its associated substation circuit when all of said substation circuits are on-hook.

3. In combination: a plurality of telephone sets connected by a common transmission line to a central office, a source of direct current at said central office, each of said telephone sets including a sound radiator and a breakdown diode connected in series across said line, the line voltage at each of said sets having a first value when all sets are on-hook and a second value when any set is off-hook, said diodes each having a breakdown voltage intermediate said first and second values and each poled to operate in its breakdown region in response to applied voltages of said first value.

4. In combination: a source of direct current, a plurality of utilization means, a signalling device associated with each of said utilization means, a diode connected in series with each of said signalling devices and said source and biased by said source to have substantially no effect on the output of said device when none of said means are being utilized, and means responsive to the utilization of any one of said utilization means to alter the bias and hence resistance condition of each of said diodes so as to effectively disable its associated signalling device.

5. A party line telephone system comprising a plurality of telephone sets each having a pair of terminals connected to a central office by a common transmission line, a source of direct current at said central office for supplying power to said telephone sets, the terminal voltage at each of said sets varying between a first value when all sets are on-hook and a second value when any one of said sets is off-hook, each of said sets including a signalling circuit comprising an amplifier, an indicating device connected to and energized by the output of said amplifier and a semi-conductor breakdown diode connected in series with said indicating device and biased by the current received from said source, said diode having a breakdown voltage intermediate said first and second values and poled to operate in its breakdown region in response to applied voltages of said first value.

6. The combination in accordance with claim 5 wherein said indicating device comprises a sound radiator.

7. The combination in accordance with claim 5 wherein said indicating device, said diode, and the output of said amplifier are connected in series across said transmission line.

8. The combination in accordance with claim 5 wherein said amplifier comprises a transistor having base, collector, and emitter electrodes, wherein said indicating device and said diode are connected in series with said collector and wherein said diode has developed across it a substantially constant voltage in said breakdown region and wherein the said breakdown voltage has a value intermediate said first and second values of substantially the proper value for proper operation of said collector electrode.

9. In combination: a plurality of load circuits energized by a common source of direct current, means responsive to a change in condition associated with any one of said load circuits for varying the terminal voltage of each of said load circuits from a first value to a second value, and a breakdown diode connected in series with each of said load circuits and poled to conduct in its reverse direction, each of said diodes having a breakdown voltage intermediate the first and second values of terminal voltage of its associated load circuit.

10. The combination in accordance with claim 9 wherein said diode comprises a p-n junction silicon diode.

References Cited in the file of this patent

UNITED STATES PATENTS

| | | |
|---|---|---|
| 2,001,095 | Deakin | May 14, 1935 |
| 2,133,814 | Halligan | Oct. 18, 1938 |
| 2,245,799 | McClew | June 17, 1941 |